(12) United States Patent
Watanabe (10) Patent No.: US 12,443,278 B2
(45) Date of Patent: Oct. 14, 2025

(54) DISPLAY CONTROL METHOD AND DISPLAY CONTROL DEVICE

(71) Applicant: Nissan Motor Co., Ltd., Kanagawa (JP)

(72) Inventor: Hiroshi Watanabe, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 18/833,596

(22) PCT Filed: Oct. 11, 2022

(86) PCT No.: PCT/JP2022/037911
§ 371 (c)(1),
(2) Date: Jul. 26, 2024

(87) PCT Pub. No.: WO2023/145145
PCT Pub. Date: Aug. 3, 2023

(65) Prior Publication Data
US 2025/0103134 A1    Mar. 27, 2025

(30) Foreign Application Priority Data
Jan. 31, 2022  (JP) ................ 2022-013636

(51) Int. Cl.
| | |
|---|---|
| *G06F 3/01* | (2006.01) |
| *B60K 35/10* | (2024.01) |
| *B60K 35/21* | (2024.01) |
| *B60K 35/22* | (2024.01) |
| *B60K 35/81* | (2024.01) |
| *B60K 35/90* | (2024.01) |
| *B60K 35/65* | (2024.01) |

(52) U.S. Cl.
CPC .............. *G06F 3/013* (2013.01); *B60K 35/10* (2024.01); *B60K 35/21* (2024.01); *B60K 35/22* (2024.01);
(Continued)

(58) Field of Classification Search
CPC .... B60K 35/00; B60K 35/233; B60K 35/235; B60K 35/81; B60K 2360/149;
(Continued)

(56) References Cited

U.S. PATENT DOCUMENTS

| | | |
|---|---|---|
| 10,645,510 B2 | 5/2020 | Ohara |
| 10,703,272 B2 | 7/2020 | Suzuki et al. |

(Continued)

FOREIGN PATENT DOCUMENTS

| | | |
|---|---|---|
| JP | H07-257228 A | 10/1995 |
| JP | 2019-217941 A | 12/2019 |

(Continued)

*Primary Examiner* — Nelson M Rosario
(74) *Attorney, Agent, or Firm* — Osha Bergman Watanabe & Burton LLP (57) ABSTRACT

A computer performs processing including: generating an image to be presented to a driver in a preset coordinate system; identifying a display position at which the generated image is displayed in a field of vision of a driver, based on a viewpoint position of the driver; generating a driver viewpoint image obtained by converting the generated image to an image represented in a coordinate system defined with the viewpoint position as a reference; causing the driver viewpoint image to be displayed in such a manner that the driver viewpoint image overlaps a field of vision of the driver; detecting a line of sight of the driver; and when determining that a change amount of the detected line of sight exceeds a threshold value, suppressing change in a position at which the driver viewpoint image is displayed occurring in association with change in the viewpoint position.

17 Claims, 4 Drawing Sheets

(52) U.S. Cl.
CPC .............. *B60K 35/81* (2024.01); *B60K 35/90* (2024.01); *B60K 35/654* (2024.01)

(58) Field of Classification Search
CPC ............ B60K 2360/21; B60K 2360/31; B60K 35/654; B60W 40/08; B60W 50/14; G02B 27/01; G02B 27/0093; G06T 19/00; G09G 5/00; G09G 5/36; G09G 5/377; H04N 5/66; G06F 3/013
See application file for complete search history.

(56) References Cited

U.S. PATENT DOCUMENTS

| | | | |
|---|---|---|---|
| 10,937,345 | B2 | 3/2021 | Funabiki et al. |
| 11,220,274 | B2 | 1/2022 | Banno et al. |
| 11,393,381 | B2 * | 7/2022 | Kim ..................... G09G 3/3208 |
| 11,428,931 | B2 | 8/2022 | Higashiyama et al. |
| 2018/0144672 | A1 | 5/2018 | Fujita |
| 2019/0111844 | A1 | 4/2019 | Suzuki et al. |
| 2019/0359228 | A1 | 11/2019 | Banno et al. |
| 2019/0392740 | A1 | 12/2019 | Funabiki et al. |
| 2020/0103649 | A1 * | 4/2020 | Higashiyama ......... B60K 35/81 |
| 2022/0365594 | A1 * | 11/2022 | Liu .................... G02B 27/0172 |

FOREIGN PATENT DOCUMENTS

| | | |
|---|---|---|
| JP | 2020-50147 A | 4/2020 |
| JP | 2020-199883 A | 12/2020 |
| WO | 2017/018122 A1 | 2/2017 |
| WO | 2017/168953 A1 | 10/2017 |
| WO | 2018/147066 A1 | 8/2018 |

* cited by examiner

DISPLAY CONTROL METHOD AND DISPLAY CONTROL DEVICE

Technical Field

The present invention relates to a display control method and a display control device.

Background Art

As a technology for correcting a position of an image to be displayed on a projection plane of a windshield or the like according to a position of a viewpoint of a driver, for example, a technology disclosed in PTL 1 has been proposed. In the technology disclosed in PTL 1, a position of an image displayed on a projection plane in such a manner that the image is superimposed on a leading vehicle or the like is constantly corrected in accordance with movement of a line of sight of a driver.

CITATION LIST

Patent Literature

PTL 1: WO 2017/168953 A1

SUMMARY OF INVENTION

Technical Problem

In the technology disclosed in PTL 1, since the position of an image projected on the projection plane is constantly corrected in accordance with the movement of the line of sight of the driver, there is a risk that the driver feels inconvenience since while the line of sight of the driver is moving, the position of the image constantly changes and difference occurs between the positions of a target object and the image.

The present invention has been made in consideration of the above-described problem, and an object of the present invention is to provide a display control method and a display control device capable of reducing inconvenience that a driver feels.

Solution to Problem

According to an aspect of the present invention, there is provided a display control method for causing a computer to perform processing including: generating an image to be presented to a driver in a preset coordinate system; detecting a position of an eye of the driver; identifying a viewpoint position indicating a position of an eye of a driver in a vehicle interior, based on the detected position of an eye; identifying a display position at which the generated image is displayed in a field of vision of the driver, based on the identified viewpoint position; generating a driver viewpoint image, the driver viewpoint image being an image obtained by converting the generated image to an image represented in a coordinate system defined with the identified viewpoint position as a reference; causing the driver viewpoint image to be displayed in such a manner that the driver viewpoint image overlaps a field of vision of the driver; detecting a line of sight of the driver; determining whether or not a change amount of the detected line of sight exceeds a preset threshold value; and when determining that a change amount of the detected line of sight exceeds the threshold value, suppressing change in a position at which the driver view- point image is displayed occurring in association with change in the viewpoint position.

Advantageous Effects of Invention

According to an aspect of the present invention, it is possible to provide a display control method and a display control device capable of reducing inconvenience that a driver feels.

DESCRIPTION OF EMBODIMENTS

Embodiments of the present invention will be described below with reference to the drawings. In the description of the drawings, the same or similar parts are provided with the same or similar reference signs, and duplicate descriptions thereof will be omitted. The respective drawings are schematic and do not necessarily depict the actual dimensions or precise configurations of practical implementation of the present invention. The following embodiments indicates devices and methods to embody the technical idea of the present invention by way of example, and the technical idea of the present invention is not intended to be limited to the devices and methods indicated in the following embodiments. The technical idea of the present invention can be subjected to a variety of alterations within the technical scope prescribed by the claims described in CLAIMS.

First Embodiment

A first embodiment of the present invention will be described below with reference to the drawings.
(Configuration)
A configuration of a display control device 1 will be described using FIG. 1.

Figure 1:
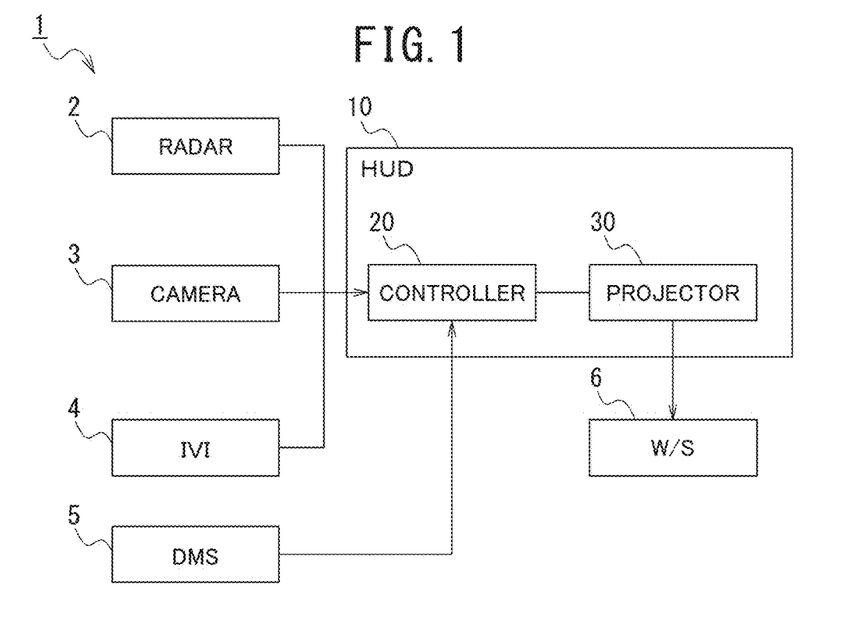
FIG. 1 is a block diagram illustrative of a configuration of a display control device of a first embodiment.

The display control device 1 is installed in a vehicle and includes a head-up display (HUD) 10. The vehicle including the HUD 10 is, for example, an electric vehicle that includes an electric motor as a drive source, an engine-driven vehicle that includes an internal-combustion engine as a drive source, or a hybrid vehicle that includes both an electric motor and an internal-combustion engine as drive sources.
<HUD>

The HUD 10 includes a controller 20 and a projector 30.

The controller 20 is an electronic control unit (ECU) that controls operation of the display control device 1. The controller 20 is also an electronic control unit that performs display control of the HUD 10.

The controller 20 includes, for example, a processor and peripheral components, such as a storage device. The processor may be, for example, a CPU or an MPU. The storage device may include a non-transitory physical storage medium like a memory or the like, such as a ROM and a RAM, that is used as registers, a cache memory, and a main storage device. Note that, for example, a dominant eye of a driver of the vehicle may be stored in the storage device.

Functions of the controller 20 are achieved by, for example, the processor executing computer programs stored in the storage device. Note that a specific configuration of the controller 20 will be described later.

In addition, the controller 20 accepts input of information from a radar 2, a camera 3, an in-vehicle infotainment (IVI) 4, and a driver monitoring system (DMS) 5.

The radar 2 is formed using a laser range finder (LRF), a radar, a laser radar of a light detection and ranging (LiDAR), or the like.

In addition, the radar 2 detects a relative position between an object existing around the vehicle and the vehicle and outputs relative position information that is information including the detected relative position, to the controller 20. Note that the object existing around the vehicle is, for example, a leading vehicle that is traveling in front of the vehicle or a pedestrian or a light road vehicle (a bicycle or the like) existing around the vehicle.

The camera 3 captures an image of a surrounding environment of the vehicle and outputs surrounding environment information that is information including the detected surrounding environment of the vehicle, to the controller 20. Note that in the storage device included in the controller 20, an attachment position of the camera 3 is stored.

The IVI 4 includes, for example, a storage device that stores map data or the like and a global positioning system (GPS) or the like that detects a current position of the vehicle. In addition, the IVI 4 outputs navigation information, such as a traveling direction at an intersection, and road environment information that is information indicating what type of building (a commercial facility, a hospital, a public office, or the like) a building that the driver can visually recognize during traveling is, to the controller 20.

The DMS 5 is formed using, for example, an image capturing device arranged in a vehicle interior and detects positions of the eyes, a line-of-sight direction, and a direction of the face regarding the driver seated in a driver seat. In addition, the DMS 5 outputs viewpoint position information that is information indicating the detected positions of the eyes, line-of-sight direction information that is information indicating the detected line-of-sight direction, and head direction information that is information indicating the detected direction of the face, to the controller 20.

The projector 30 projects an image on a windshield (W/S) 6.

The W/S 6 is a surface on the inner side of a front window of the vehicle. Note that in the storage device included in the controller 20, a three-dimensional shape of the W/S 6 is stored.

(Specific Configuration of Controller)

Figure 2:
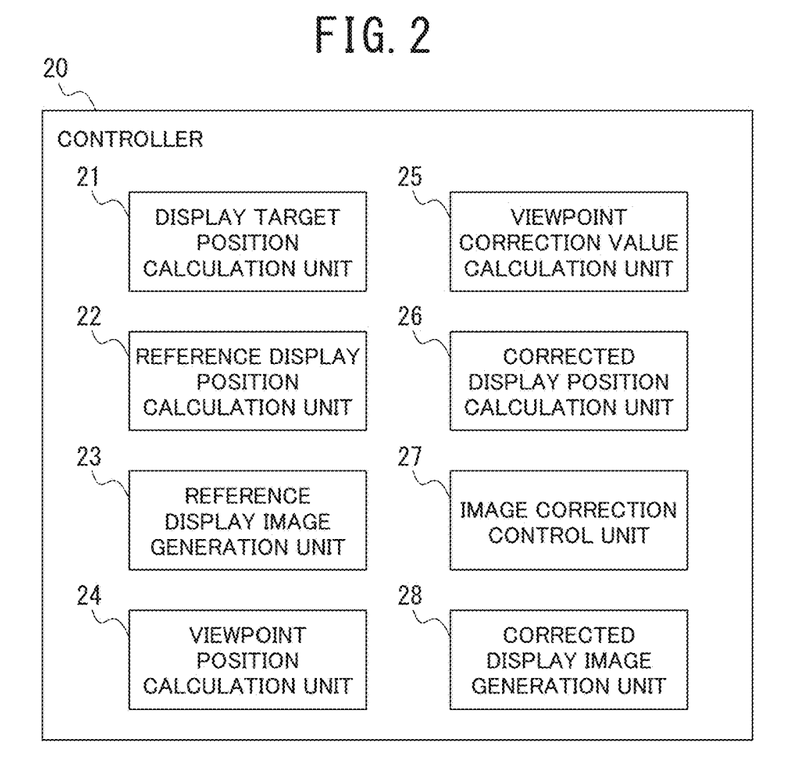
FIG. 2 is a block diagram illustrative of a functional configuration of a controller in the first embodiment.

The controller 20 includes, as illustrated in FIG. 2, a display target position calculation unit 21, a reference display position calculation unit 22, a reference display image generation unit 23, a viewpoint position calculation unit 24, a viewpoint correction value calculation unit 25. In addition to the above, the controller 20 includes a corrected display position calculation unit 26, an image correction control unit 27, and a corrected display image generation unit 28.

<Display Target Position Calculation Unit>

The display target position calculation unit 21 refers to the relative position information and the surrounding environment information and calculates, as coordinates indicating a position of a target object (a leading vehicle, a pedestrian, or a light road vehicle) the image of which is to be projected on the W/S 6, three-dimensional coordinates (a coordinate along the X-axis, a coordinate along the Y-axis, and a coordinate along the Z-axis) of the target object. The three-dimensional coordinates of a target object that the display target position calculation unit 21 calculates are, for example, coordinates in a coordinate system defined with a viewpoint position of the camera 3 as a reference.

The display target position calculation unit 21 outputs display target position information that is information including the three-dimensional coordinates of the target object, to the reference display image generation unit 23.

<Reference Display Position Calculation Unit>

The reference display position calculation unit 22 calculates a reference position at which an image to be projected on the W/S 6 is displayed (a reference display position), with a position of the head of the driver and a viewpoint of the driver as a reference position. Note that the reference display position that the reference display position calculation unit 22 calculates is, for example, calculated with the position of the head of the driver and the viewpoint of the driver when the driver seated in the driver seat is in a state of causing the vehicle to travel straight forward (a state in which the driver faces forward) as a reference position.

The reference display position calculation unit 22 outputs reference display position information that is information including the reference display position, to the reference display image generation unit 23.

<Reference Display Image Generation Unit>

The reference display image generation unit 23 performs processing of generating an image (virtual image) matching a target object with reference to the relative position information, the surrounding environment information, and the display target position information.

The reference display image generation unit 23 outputs reference display image information that is information including the generated image, to the corrected display image generation unit 28.

Figure 3:
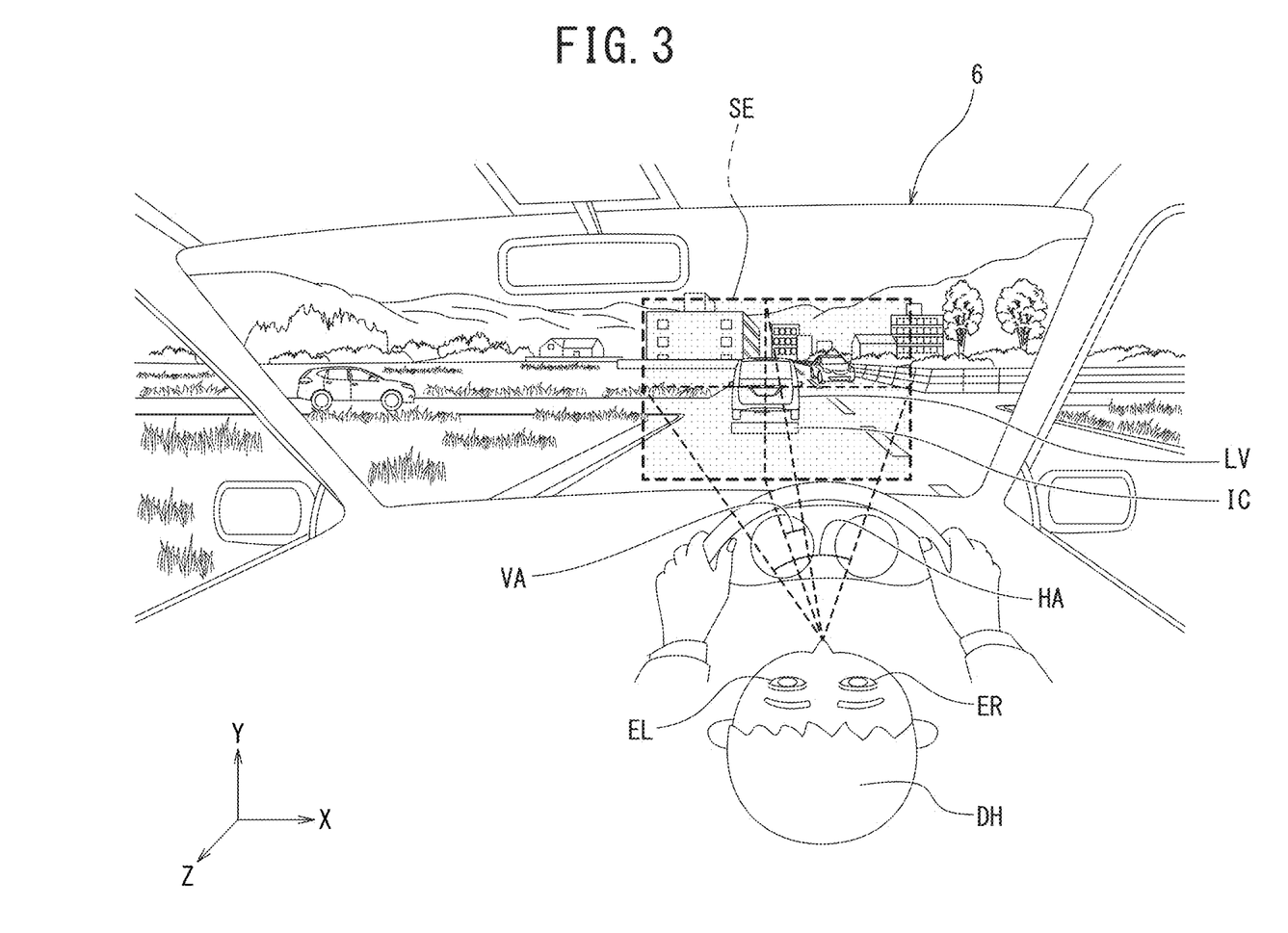
FIG. 3 is a diagram descriptive of an example of processing that the controller performs.

Note that the image (virtual image) matching a target object is, for example, an icon IC or the like indicating existence of a leading vehicle LV, as illustrated in FIG. 3. Note that the icon IC is, for example, formed in a blinking rectangle with area matching vehicle width of the leading vehicle LV. In addition, a position at which the icon IC is displayed is set to, for example, a position in the rear of the leading vehicle LV when viewed from the driver.

In addition, the image that the reference display image generation unit 23 generates is, for example, generated in the coordinate system defined with the viewpoint position of the camera 3 as a reference.

Therefore, the reference display image generation unit 23, included in the controller 20, performs processing of generating an image to be presented to the driver in a preset coordinate system (the coordinate system defined with the viewpoint position of the camera 3 as a reference).

<Viewpoint Position Calculation Unit>

The viewpoint position calculation unit 24 performs processing of calculating a viewpoint position that is represented by positions of the eyes of the driver seated in the driver seat with reference to the viewpoint position information. The viewpoint position calculation unit 24 outputs viewpoint position information that is information including the calculated viewpoint position, to the viewpoint correction value calculation unit 25.

Note that the viewpoint position that the viewpoint position calculation unit 24 calculates is represented by positions of both eyes (the right eye ER and the left eye EL) of the driver and is calculated in the three-dimensional coordinates. Note that in FIG. 3, the head of the driver seated in the driver seat is indicated by a reference sign "DH".

Therefore, the viewpoint position calculation unit 24, included in the controller 20, performs processing of detecting the positions of the eyes of the driver and processing of identifying a viewpoint position indicating the positions of the eyes of the driver in the vehicle interior, based on the detected positions of the eyes.

<Viewpoint Correction Value Calculation Unit>

The viewpoint correction value calculation unit 25 calculates a viewpoint correction value that is a change amount between a line of sight serving as a reference and a current line of sight of the driver seated in the driver seat, with reference to the viewpoint position information and the line-of-sight direction information. Note that the line of sight serving as a reference is, for example, a line of sight that is calculated with the position of the head of the driver and the positions of the eyes of the driver when the driver seated in the driver seat is in a state of facing forward as a reference. That is, the line of sight serving as a reference is, for example, a line of sight pointing forward.

The viewpoint correction value calculation unit 25 outputs viewpoint correction value information that is information including the calculated viewpoint correction value, to the corrected display position calculation unit 26 and the image correction control unit 27.

Therefore, the viewpoint correction value calculation unit 25, included in the controller 20, performs processing of detecting a line of sight of the driver.

<Corrected Display Position Calculation Unit>

The corrected display position calculation unit 26 calculates a corrected display position that is a position within the W/S 6 that corresponds to the current line of sight of the driver and at which an image is projected, with reference to the reference display image information and the viewpoint correction value information.

The corrected display position calculation unit 26 outputs corrected display position information that is information including the calculated corrected display position, to the image correction control unit 27 and the corrected display image generation unit 28.

Therefore, the corrected display position calculation unit 26, included in the controller 20, performs processing of identifying a display position at which a generated image is displayed in a field of vision of the driver, based on an identified viewpoint position.

<Image Correction Control Unit>

The image correction control unit 27 stores an area in which the projector 30 can display an image on the W/S 6 (a displayable area), coordinates of the center point of the displayable area SE (center point coordinates), and threshold values (change amount threshold values).

The displayable area SE is a portion of the W/S 6, as illustrated in FIG. 3 and is set and stored in advance. Note that in the first embodiment, a case where the displayable area SE is set as a quadrilateral area will be described as an example.

The center point coordinates are coordinates calculated in the three-dimensional coordinates and are stored in advance.

The change amount threshold values include a horizontal angle threshold value $\phi$th and a vertical angle threshold value $\psi$th.

The horizontal angle threshold value $\phi$th is a value indicating an angle that is formed in the vehicle width direction (right-left direction) from the center point coordinates and is a preset value. Note that in the first embodiment, as an example, a horizontal threshold value band HA ($\phi$th×2) is defined as a value obtained by adding a horizontal angle threshold value $\phi$th that is set in the leftward direction from the center point coordinates and a horizontal angle threshold value $\phi$th that is set in the rightward direction from the center point coordinates, as illustrated in FIG. 3.

The vertical angle threshold value $\psi$th is a value indicating an angle that is formed in the height direction (up-down direction) from the center point coordinates and is a preset value. Note that in the first embodiment, as an example, a vertical threshold value band VA ($\psi$th×2) is defined as a value obtained by adding a vertical angle threshold value $\psi$th that is set in the upward direction from the center point coordinates and a vertical angle threshold value $\psi$th that is set in the downward direction from the center point coordinates, as illustrated in FIG. 3.

In addition, the image correction control unit 27 calculates a change amount of the line of sight, which is included in the line-of-sight direction information, from the center point coordinates, with reference to the line-of-sight direction information and the center point coordinates. Specifically, the image correction control unit 27 calculates a horizontal change amount $\phi$d that is a change amount of the line of sight, which is included in the line-of-sight direction information, in the horizontal direction with the center point coordinates as a reference. In addition to the above, the image correction control unit 27 calculates a vertical change amount $\psi$d that is a change amount of the line of sight, which is included in the line-of-sight direction information, in the vertical direction with the center point coordinates as a reference.

Further, the image correction control unit 27 compares the horizontal change amount $\phi$d with the horizontal angle threshold value $\phi$th and compares the vertical change amount $\psi$d with the vertical angle threshold value $\psi$th.

When the image correction control unit 27 determines that the horizontal change amount $\phi$d is less than or equal to the horizontal angle threshold value $\phi$th and at the same time, the vertical change amount $\psi$d is less than or equal to the vertical angle threshold value $\psi$th, the image correction control unit 27 outputs image output command information to the corrected display image generation unit 28. The image output command information is information that includes an image output command to output a generated image.

In contrast, when the image correction control unit 27 determines that at least one of a condition requiring the horizontal change amount $\phi$d to exceed the horizontal angle threshold value $\phi$th and a condition requiring the vertical change amount $\psi$d to exceed the vertical angle threshold value $\psi$th is established, the image correction control unit 27 outputs image suppression command information to the corrected display image generation unit 28. The image suppression command information is information that includes an image suppression command to suppress a change in a position at which a driver viewpoint image, which will be described later, is to be displayed.

In addition, at a time point when the image correction control unit 27 determines that at least one of the condition requiring the horizontal change amount $\phi$d to exceed the horizontal angle threshold value $\phi$th and the condition requiring the vertical change amount $\psi$d to exceed the vertical angle threshold value $\psi$th is established, the image correction control unit 27 outputs image position fixing information to the corrected display image generation unit 28. The image position fixing information is information that includes an image position fixing signal to fix the position at which the driver viewpoint image is to be displayed. In addition to the above, when a change amount ($\phi$d or $\psi$d) that has exceeded a corresponding threshold value ($\phi$th or $\psi$th) returns to a value less than or equal to the threshold value, the image correction control unit 27 outputs fixing release information that is information including a fixing release signal to release the fixing of the position at which the driver viewpoint image is to be displayed, to the corrected display image generation unit 28.

Therefore, the image correction control unit 27, included in the controller 20, performs processing of determining whether or not the detected change amount of the line of sight exceeds a preset threshold value.

In addition, when the image correction control unit 27, included in the controller 20, determines that the detected change amount of the line of sight exceeds the threshold value, the image correction control unit 27 performs processing of suppressing change in the position at which the driver viewpoint image is displayed occurring in association with change in the viewpoint position.

In addition, at a time point when the image correction control unit 27, included in the controller 20, determines that a change amount ($\phi$d or $\psi$d) exceeds a corresponding threshold value ($\phi$th or $\psi$th), the image correction control unit 27 fixes the position at which the driver viewpoint image is displayed. Further, when the change amount ($\phi$d or $\psi$d) that has exceeded the corresponding threshold value ($\phi$th or $\psi$th) returns to a value less than or equal to the threshold value, the image correction control unit 27 releases the fixing of the position at which the driver viewpoint image is displayed.

<Corrected Display Image Generation Unit>

The corrected display image generation unit 28 generates a driver viewpoint image that is an image obtained by converting an image that the reference display image generation unit 23 generates to an image represented in a coordinate system defined with the current viewpoint position of the driver as a reference, with reference to the reference display image information and the viewpoint correction value information.

Further, when the corrected display image generation unit 28 receives an input of the image output command information, the corrected display image generation unit 28 performs processing of causing a driver viewpoint image to be displayed in such a manner that the driver viewpoint image overlaps the field of vision of the driver. Note that the field of vision of the driver is, for example, calculated by detecting the positions of the eyes of the driver, using the camera 3.

The corrected display image generation unit 28 generates a projection image information that is information including an image to be projected on the W/S 6 and outputs the generated projection image information to the projector 30. The projector 30 that has received an input of the projection image information projects the image on the W/S 6.

Therefore, the corrected display image generation unit 28 having received an input of the image output command information generates information to cause a driver viewpoint image (icon IC) to be displayed in such a manner that the driver viewpoint image overlaps the field of vision of the driver according to the current viewpoint position of the driver, as projection image information.

In addition, when the corrected display image generation unit 28 receives an input of the image position fixing information in addition to the image suppression command information, the corrected display image generation unit 28 generates information to fix the position at which the driver viewpoint image is displayed at a time point when the image correction control unit 27 determines that a change amount ($\phi$d or $\psi$d) exceeds a corresponding threshold value ($\phi$th or $\psi$th), as the projection image information.

Further, when the corrected display image generation unit 28 receives an input of the fixing release information in addition to the image suppression command information, the corrected display image generation unit 28 generates information to release the fixing of the position at which the driver viewpoint image is displayed, as the projection image information.

Therefore, the corrected display image generation unit 28, included in the controller 20, performs processing of generating a driver viewpoint image that is an image obtained by converting a generated image to an image represented in the coordinate system defined with an identified viewpoint position as a reference.

In addition, the corrected display image generation unit 28, included in the controller 20, performs processing of causing the driver viewpoint image to be displayed in such a manner that the driver viewpoint image overlaps the field of vision of the driver.

Operation

Figure 4:
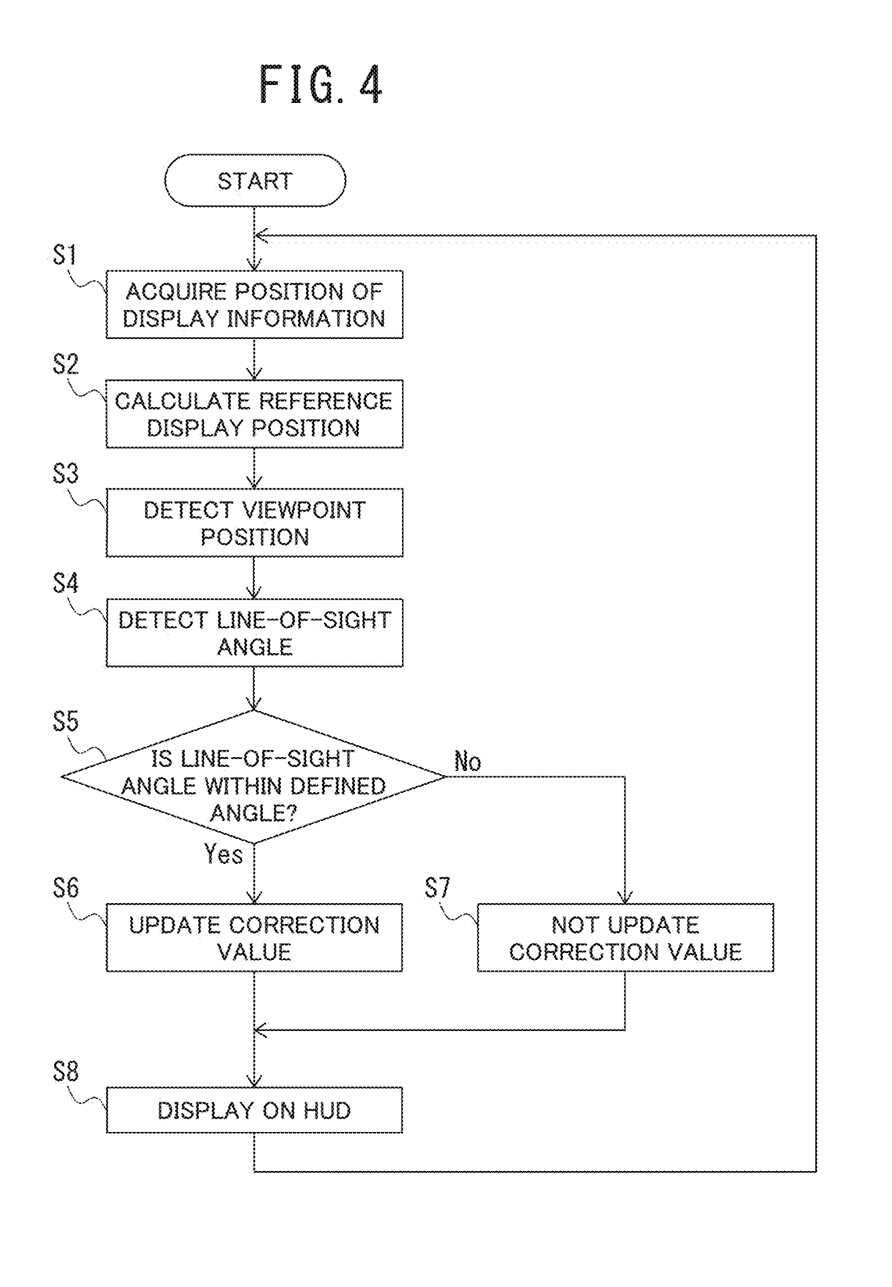
FIG. 4 is a flowchart illustrative of an example of a display control method in the first embodiment.

Next, an example of a display control method that is performed using the display control device 1 while the vehicle is traveling will be described, using FIG. 4 while referring to FIGS. 1 to 3.

While the vehicle is traveling, in step S1, the controller 20 acquires, as information about a target object to be displayed (projected) on the W/S 6, a position (in the three-dimensional coordinates) of the target object, using the camera 3.

In step S2, the controller 20 calculates a reference display position.

In step S3, the controller 20 detects a viewpoint position of the driver seated in the driver seat in the three-dimensional coordinates.

In step S4, the controller 20 detects a horizontal change amount $\phi$d and a vertical change amount $\psi$d of the line of sight of the driver.

In step S5, the controller 20 determines whether or not the horizontal change amount $\phi$d is less than or equal to a horizontal angle threshold value $\phi$th and at the same time, the vertical change amount $\psi$d is less than or equal to a vertical angle threshold value $\psi$th. When the controller 20 determines that the horizontal change amount $\phi$d is less than or equal to the horizontal angle threshold value $\phi$th and at the same time, the vertical change amount $\psi$d is less than or equal to the vertical angle threshold value $\psi$th (step S5: Yes), the process proceeds to step S6. In contrast, when the controller 20 determines that at least one of a condition requiring the horizontal change amount $\phi$d to exceed the horizontal angle threshold value $\phi$th and a condition requiring the vertical change amount $\psi$d to exceed the vertical angle threshold value $\psi$th is established (step S5: No), the process proceeds to step S7. That is, in step S5, the controller 20 determines whether or not angles of a line of sight of the driver (the vertical change amount $\psi$d and the horizontal change amount $\phi$d) are less than or equal to defined angles (the vertical angle threshold value $\psi$th and the horizontal angle threshold value $\phi$th), respectively.

In step S6, the controller 20 calculates and updates a viewpoint correction value and calculates a corrected display position corresponding to a current line of sight of the driver according to the updated viewpoint correction value.

In step S7, the controller 20 does not update the viewpoint correction value. The controller 20 calculates a corrected display position corresponding to a line of sight at a time point when the controller 20 determines that at least one of the condition requiring the horizontal change amount ϕd to exceed the horizontal angle threshold value ϕth and the condition requiring the vertical change amount ψd to exceed the vertical angle threshold value ψth is established.

In step S8, the controller 20 projects a driver viewpoint image by causing the projector 30, included in the HUD 10, to display the driver viewpoint image at the corrected display position calculated in step S6 or S7 within the W/S 6. Subsequently, the process returns to step S1.

Note that when the process proceeds from step S6 to step S8, the controller 20 causes an icon IC that is a driver viewpoint image to be displayed at a position corresponding to a current viewpoint of the driver inside the displayable area SE within the W/S 6. Therefore, when the line of sight of the driver moves only inside the displayable area SE, the controller 20 causes the icon IC to be displayed at a position to which the line of sight of the driver points inside the displayable area SE.

In addition, when the process proceeds from step S7 to step S8, the controller 20 causes the icon IC to be displayed at a position corresponding to a line of sight at the time point when the controller 20 determines that a condition requiring a change amount (ϕd or ψd) to exceed a corresponding threshold value (ϕth or ψth) is established, inside the displayable area SE within the W/S 6. As an example, in the state illustrated in FIG. 3, when the line of sight of the driver has left the displayable area SE and largely moved to the left-hand side and points to another vehicle entering an intersection from the leftward direction, the controller 20 causes the icon IC to be displayed at the left edge of the displayable area SE. At and after a time point when the line of sight of the driver that has left the displayable area SE and largely moved to the left-hand side returns to the inside of the displayable area SE, the controller 20 causes the icon IC to be displayed at a position to which the line of sight of the driver points inside the displayable area SE.

It should be noted that the foregoing first embodiment is one example of the present invention, the present invention is not limited to the foregoing first embodiment, and, even when the present invention may be carried out in modes other than the embodiment, various changes may be made to the present invention, according to designs within a scope not departing from the technical idea of the present invention Advantageous Effects of First Embodiment The display control device of the first embodiment enables advantageous effects described below to be attained.

(1) The computer that the display control device 1 includes performs processing of generating an image to be presented to the driver in a preset coordinate system, processing of detecting positions of the eyes of the driver, and processing of identifying a viewpoint position indicating the positions of the eyes of the driver in the vehicle interior, based on the detected positions of the eyes. The computer further performs processing of identifying a display position at which the generated image is displayed within the field of vision of the driver, based on the identified viewpoint position and processing of generating a driver viewpoint image that is an image obtained by converting the generated image to an image represented in a coordinate system defined with the identified viewpoint position as a reference. In addition to the above, the computer performs processing of causing the driver viewpoint image to be displayed in such a manner that the driver viewpoint image overlaps the field of vision of the driver, processing of detecting a line of sight of the driver, and a processing of determining whether or not a change amount of the detected line of sight exceeds a preset threshold value. When the computer determines that the detected change amount of the line of sight exceeds the threshold value, the computer performs processing of suppressing change in the position at which the driver viewpoint image is displayed occurring in association with change in the viewpoint position.

Thus, when the change amount of the line of sight of the driver is less than or equal to the threshold value, it becomes possible to display the driver viewpoint image at a position matching change in the viewpoint position of the driver within the field of vision of the driver. In contrast, when the change amount of the line of sight of the driver exceeds the threshold value, it becomes possible to prevent the position of the image from changing in order to suppress change in the position at which the driver viewpoint image is displayed occurring in association with change in the viewpoint position.

As a result, it becomes possible to provide the display control device 1 capable of reducing inconvenience that the driver feels.

(2) The computer fixes the position at which the driver viewpoint image is displayed at a time point when the computer determines that a change amount (ϕd or ψd) exceeds a corresponding threshold value (ϕth or ψth). Further, when the change amount (ϕd or ψd) that has exceeded the corresponding threshold value (ϕth or ψth) returns to a value less than or equal to the threshold value, the computer releases the fixing of the position at which the driver viewpoint image is displayed.

As a result, it becomes possible to suppress a flicker of an image by fixing the position at which the driver viewpoint image is displayed when the driver moves the line of sight, such as when the driver checks the right- and left-hand sides at an intersection or the like, and releasing the fixing of the position at which the driver viewpoint image is displayed when the line of sight of the driver returns to the original line of sight.

In addition, the display control method of the first embodiment enables an advantageous effect described below to be attained.

(3) The display control method causes the computer to perform processing of generating an image to be presented to the driver in a preset coordinate system, processing of detecting the positions of the eyes of the driver, and processing of identifying a viewpoint position that indicates the positions of the eyes of the driver in the vehicle interior, based on the detected positions of the eyes. In addition, the display control method causes the computer to perform processing of identifying a display position at which the generated image is displayed within the field of vision of the driver, based on the identified viewpoint position and processing of generating a driver viewpoint image that is an image obtained by converting the generated image to an image represented in a coordinate system defined with the identified viewpoint position as a reference. Further, the display control method causes the computer to perform processing of causing the driver viewpoint image to be displayed in such a manner that the driver viewpoint image overlaps the field of vision of the driver, processing of detecting a line of sight of the driver, and a processing of determining whether or not a change amount of the detected line of sight exceeds a preset threshold value. When the computer determines that the detected change amount of the line of sight exceeds the threshold value, the display control method causes the computer to perform processing of suppressing change in the position at which the driver viewpoint image is displayed occurring in association with change in the viewpoint position.

Thus, when the change amount of the line of sight of the driver is less than or equal to the threshold value, it becomes possible to display the driver viewpoint image at a position matching change in the viewpoint position of the driver within the field of vision of the driver. In contrast, when the change amount of the line of sight of the driver exceeds the threshold value, it becomes possible to prevent the position of the image from changing in order to suppress change in the position at which the driver viewpoint image is displayed occurring in association with change in the viewpoint position.

As a result, it becomes possible to provide the display control method capable of reducing inconvenience that the driver feels.

Variations of First Embodiment (1) In the first embodiment, a configuration to fix the position at which the driver viewpoint image is displayed at a time point when a change amount ($\phi d$ or $\psi d$) is determined to exceed a corresponding threshold value ($\phi th$ or $\psi th$) and release the fixing of the position at which the driver viewpoint image is displayed when the change amount that has exceeded the corresponding threshold value returns to a value less than or equal to the threshold value was employed. However, the present invention is not limited to the configuration.

That is, a configuration to erase the driver viewpoint image at a time point when the change amount is determined to exceed the corresponding threshold value and redisplay the erased driver viewpoint image when the change amount that has exceeded the corresponding threshold value returns to a value less than or equal to the threshold value may be employed.

In this case, it becomes possible to reduce inconvenience that the driver feels for a display on the W/S 6 by, under the assumption that the line of sight of the driver follows another target object (for example, another vehicle other than a leading vehicle), erasing a target object that the driver viewpoint image indicates (for example, the leading vehicle).

(2) In the first embodiment, a configuration to fix the position at which the driver viewpoint image is displayed at a time point when a change amount ($\phi d$ or $\psi d$) is determined to exceed a corresponding threshold value ($\phi th$ or $\psi th$) and release the fixing of the position at which the driver viewpoint image is displayed when the change amount that has exceeded the corresponding threshold value returns to a value less than or equal to the threshold value was employed. However, the present invention is not limited to the configuration.

That is, a configuration to cause the driver viewpoint image to fade out and to be erased at a time point when the change amount is determined to exceed the corresponding threshold value may be employed.

In this case, it becomes possible to cause a display on the W/S 6 to smoothly change by, under the assumption that the line of sight of the driver follows another target object, causing a target object that the driver viewpoint image indicates to fade out and to be erased, and thereby reduce inconvenience that the driver feels for the display on the W/S 6.

In addition to the above, a configuration to, when the change amount that has exceeded the corresponding threshold value returns to a value less than or equal to the threshold value, cause the erased driver viewpoint image to fade in and to be redisplayed in a shorter period of time than a period in which the driver viewpoint image is caused to fade out and to be erased may be employed.

In this case, since when the line of sight of the driver returns from another target object to a target object that the driver viewpoint image indicates, the erased driver viewpoint image is promptly displayed, the display on the W/S 6 smoothly changes according to the change in the line of sight. Because of this configuration, it becomes possible to reduce inconvenience that the driver feels for a display on the W/S 6.

In addition, a configuration to, when the change amount that has exceeded the corresponding threshold value returns to a value less than or equal to the threshold value, immediately redisplay the erased driver viewpoint image may be employed.

In this case, since when the line of sight of the driver returns from another target object to a target object that the driver viewpoint image indicates, the erased driver viewpoint image is immediately displayed, the display on the W/S 6 immediately changes even when change speed of the line of sight is fast. Because of this configuration, it becomes possible to reduce inconvenience that the driver feels for a display on the W/S 6.

(3) In the first embodiment, a configuration to fix the position at which the driver viewpoint image is displayed at a time point when a change amount ($\phi d$ or $\psi d$) is determined to exceed a corresponding threshold value ($\phi th$ or $\psi th$) and release the fixing of the position at which the driver viewpoint image is displayed when the change amount that has exceeded the corresponding threshold value returns to a value less than or equal to the threshold value was employed. However, the present invention is not limited to the configuration.

That is, a configuration to, by adding a hysteresis value ($\alpha$) to the threshold value, fix the position at which the driver viewpoint image is displayed at a time point when a change amount ($\phi d$ or $\psi d$) is determined to exceed a corresponding threshold value ($\phi th+\alpha$ or $\psi th+\alpha$) may be employed. Likewise, a configuration to, when the change amount ($\phi d$ or $\psi d$) that has exceeded the corresponding threshold value returns to a corresponding threshold value ($\phi th-\alpha$ or $\psi th-\alpha$), release the fixing of the position at which the driver viewpoint image is displayed may be employed.

In this case, setting the hysteresis value to an arbitrary value enables change in the position at which the driver viewpoint image is displayed to be controlled without being limited to an area within the displayable area SE.

Second Embodiment

A second embodiment of the present invention will be described below with reference to the drawings.
(Configuration)
With reference to FIGS. 1 to 3, a configuration of the second embodiment will be described. Note that in the drawings and the subsequent description, the same constituent components as constituent components in the above-described first embodiment will be described with the same reference signs assigned thereto. In addition, in the following description, descriptions of the same constituent components as the constituent components in the above-described first embodiment will be sometimes omitted.

The configuration of the second embodiment is the same as the configuration of the first embodiment except configurations of an image correction control unit 27 and a corrected display image generation unit 28.

<Image Correction Control Unit>

When the image correction control unit 27 determines that a horizontal change amount $\phi d$ is less than or equal to a horizontal angle threshold value $\phi th$ and at the same time, a vertical change amount $\psi d$ is less than or equal to a vertical angle threshold value $\psi th$, the image correction control unit 27 outputs image output command information to the corrected display image generation unit 28.

In contrast, when the image correction control unit 27 determines that at least one of a condition requiring the horizontal change amount $\phi d$ to exceed the horizontal angle threshold value $\phi th$ and a condition requiring the vertical change amount $\psi d$ to exceed the vertical angle threshold value $\psi th$ is established, the image correction control unit 27 outputs image suppression command information to the corrected display image generation unit 28.

In addition, at a time point when the image correction control unit 27 determines that at least one of the condition requiring the horizontal change amount $\phi d$ to exceed the horizontal angle threshold value $\phi th$ and the condition requiring the vertical change amount $\psi d$ to exceed the vertical angle threshold value $\psi th$ is established, the image correction control unit 27 outputs highlighting intensity reduction information to the corrected display image generation unit 28. The highlighting intensity reduction information is information that includes a highlighting intensity reduction signal to reduce a degree of highlighting of a driver viewpoint image. In addition to the above, when the change amount ($\phi d$ or $\psi d$) that has exceeded the corresponding threshold value ($\phi th$ or $\psi th$) returns to a value less than or equal to the threshold value, the image correction control unit 27 outputs highlighting intensity return information that is information including a highlighting intensity return signal to return the degree of highlighting that has been reduced to the original degree of highlighting, to the corrected display image generation unit 28.

The degree of highlighting of the driver viewpoint image is, for example, at least one of luminance and saturation of the driver viewpoint image. In the second embodiment, a case where the degree of highlighting of the driver viewpoint image is defined as luminance of the driver viewpoint image will be described, as an example.

In addition, when the image correction control unit 27 outputs a highlighting intensity reduction information, the image correction control unit 27 outputs temporal reduction information that includes a temporal reduction signal to reduce the degree of highlighting of the driver viewpoint image over time, to the corrected display image generation unit 28.

Further, when the image correction control unit 27 outputs a highlighting intensity return signal, the image correction control unit 27 outputs rapid restoration information that includes a rapid restoration signal to return the degree of highlighting of the driver viewpoint image that has been reduced to the original degree of highlighting in a shorter period of time than a period that elapsed when the degree of highlighting was reduced, to the corrected display image generation unit 28.

Therefore, at a time point when the image correction control unit 27 included in a controller 20 determines that the change amount ($\phi d$ or $\psi d$) exceeds the corresponding threshold value ($\phi th$ or $\psi th$), the image correction control unit 27 reduces the degree of highlighting of the driver viewpoint image. Further, when the change amount ($\phi d$ or $\psi d$) that has exceeded the corresponding threshold value ($\phi th$ or $\psi th$) returns to a value less than or equal to the threshold value, the image correction control unit 27 returns the degree of highlighting that has been reduced to the original degree of highlighting.

In addition, at a time point when the image correction control unit 27, included in the controller 20, determines that the change amount ($\phi d$ or $\psi d$) exceeds the corresponding threshold value ($\phi th$ or $\psi th$), the image correction control unit 27 reduces the degree of highlighting over time.

In addition, when the change amount ($\phi d$ or $\psi d$) that has exceeded the corresponding threshold value ($\phi th$ or $\psi th$) returns to a value less than or equal to the threshold value, the image correction control unit 27, included in the controller 20, returns the degree of highlighting that has been reduced to the original degree of highlighting in a shorter period of time than a period that elapsed when the degree of highlighting was reduced.

<Corrected Display Image Generation Unit>

When the corrected display image generation unit 28 receives an input of the highlighting intensity reduction information in addition to the image suppression command information, the corrected display image generation unit 28 generates information to reduce the degree of highlighting of the driver viewpoint image at a time point when the image correction control unit 27 determines that a change amount ($\phi d$ or $\psi d$) exceeds a corresponding threshold value ($\phi th$ or $\psi th$), as projection image information.

In addition, when the corrected display image generation unit 28 receives an input of the temporal reduction information in addition to the highlighting intensity reduction information, the corrected display image generation unit 28 generates information to reduce the degree of highlighting of the driver viewpoint image over time, as the projection image information.

Further, when the corrected display image generation unit 28 receives an input of the highlighting intensity return information in addition to the image suppression command information, the corrected display image generation unit 28 generates information to display the driver viewpoint image that has the reduced degree of highlighting returned to the original degree of highlighting, as the projection image information.

In addition, when the corrected display image generation unit 28 receives an input of the rapid restoration information in addition to the highlighting intensity return information, the corrected display image generation unit 28 generates information to return the degree of highlighting of the driver viewpoint image that has been reduced to the original degree of highlighting in a shorter period of time than a period that elapsed when the degree of highlighting was reduced, as the projection image information.

Operation

Figure 5:
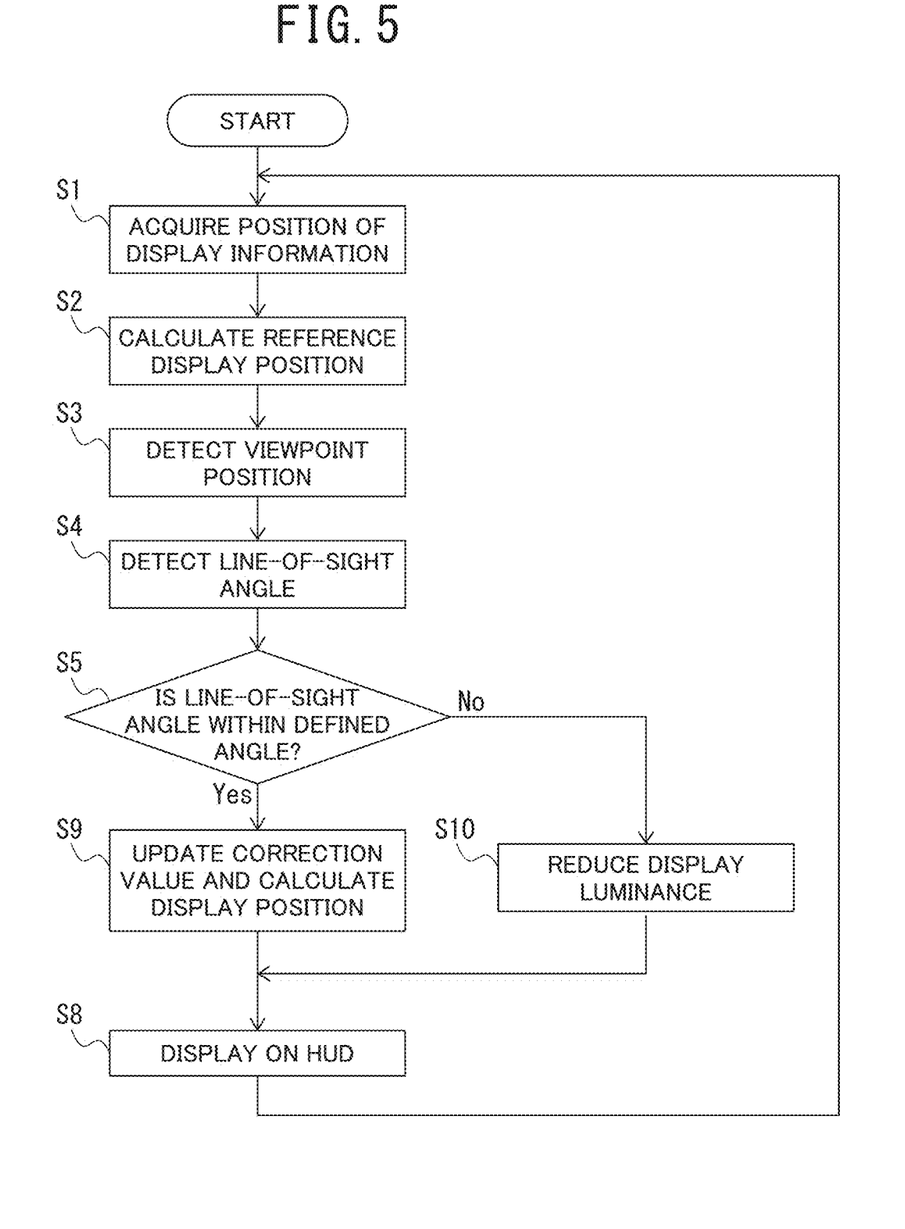
FIG. 5 is a flowchart illustrative of an example of a display control method in a second embodiment.

An example of a display control method that is performed using the display control device 1 while the vehicle is traveling will be described, using FIG. 5 while referring to FIGS. 1 to 4. Note that to the same processing as processing in the above-described first embodiment, the same step numbers are assigned.

While the vehicle is traveling, in step S1, the controller 20 acquires, as information about a target object to be displayed (projected) on a W/S 6, a position (in the three-dimensional coordinates) of the target object, using a camera 3.

In step S2, the controller 20 calculates a reference display position.

In step S3, the controller 20 detects a viewpoint position of the driver seated in a driver seat in the three-dimensional coordinates.

In step S4, the controller 20 detects a horizontal change amount $\phi d$ and a vertical change amount $\psi d$ of the line of sight of the driver.

In step S5, the controller 20 determines whether or not the horizontal change amount $\phi d$ is less than or equal to a horizontal angle threshold value $\phi th$ and at the same time, the vertical change amount $\psi d$ is less than or equal to a vertical angle threshold value $\psi th$. When the controller 20 determines that the horizontal change amount $\phi d$ is less than or equal to the horizontal angle threshold value $\phi th$ and at the same time, the vertical change amount $\psi d$ is less than or equal to the vertical angle threshold value $\psi th$ (step S5: Yes), the process proceeds to step S9. In contrast, when the controller 20 determines that at least one of a condition requiring the horizontal change amount $\phi d$ to exceed the horizontal angle threshold value $\phi th$ and a condition requiring the vertical change amount $\psi d$ to exceed the vertical angle threshold value $\psi th$ is established (step S5: No), the process proceeds to step S10. That is, in step S5, the controller 20 determines whether or not angles of a line of sight of the driver (the vertical change amount $\psi d$ and the horizontal change amount $\phi d$) are less than or equal to defined angles (the vertical angle threshold value $\psi th$ and the horizontal angle threshold value $\phi th$), respectively.

In step S9, the controller 20 calculates and updates a viewpoint correction value and calculates a corrected display position corresponding to a current line of sight of the driver according to the updated viewpoint correction value.

In step S10, the controller 20 calculates and updates a viewpoint correction value and calculates a corrected display position corresponding to a current line of sight of the driver according to the updated viewpoint correction value. In addition to the above, the controller 20 performs processing of reducing a degree of highlighting of a driver viewpoint image.

In step S8, the controller 20 projects the driver viewpoint image by causing a projector 30 included in an HUD 10 to display the driver viewpoint image at the corrected display position calculated in step S9 or S10 within the W/S 6. Subsequently, the process returns to step S1.

Note that when the process proceeds from step S9 to step S8, the controller 20 causes an icon IC that is a driver viewpoint image to be displayed at a position corresponding to a current viewpoint of the driver inside a displayable area SE within the W/S 6. Therefore, when the line of sight of the driver moves only inside the displayable area SE, the controller 20 causes the icon IC to be displayed at a position to which the line of sight of the driver points inside the displayable area SE.

In addition, when the process proceeds from step S10 to step S8, the controller 20 causes the icon IC the luminance of which is reduced to be displayed at a position corresponding to a current viewpoint of the driver within the W/S 6.

It should be noted that the foregoing second embodiment is one example of the present invention, the present invention is not limited to the foregoing second embodiment, and, even when the present invention may be carried out in modes other than the embodiment, various changes may be made to the present invention, according to designs within a scope not departing from the technical idea of the present invention Advantageous Effects of Second Embodiment The display control method using the display control device 1 of the second embodiment enables advantageous effects described below to be attained.

(1) At a time point when the computer determines that a change amount ($\phi d$ or $\psi d$) exceeds a corresponding threshold value ($\phi th$ or $\psi th$), the computer reduces a degree of highlighting of a driver viewpoint image. Further, when the change amount ($\phi d$ or $\psi d$) that has exceeded the corresponding threshold value ($\phi th$ or $\psi th$) returns to a value less than or equal to the threshold value, the computer returns the degree of highlighting that has been reduced to the original degree of highlighting.

As a result, it becomes possible to suppress a flicker of an image by reducing the degree of highlighting of the driver viewpoint image when the driver moves the line of sight, such as when the driver checks the right- and left-hand sides at an intersection or the like, and returning the degree of highlighting that has been reduced to the original degree of highlighting when the line of sight of the driver returns to the original line of sight.

(2) At a time point when the computer determines that the change amount ($\phi d$ or $\psi d$) exceeds the corresponding threshold value ($\phi th$ or $\psi th$), the computer reduces the degree of highlighting of the driver viewpoint image over time.

As a result, it becomes possible to cause a display on the W/S 6 to smoothly change by, under the assumption that the line of sight of the driver follows another target object, causing the degree of highlighting of a target object that the driver viewpoint image indicates to be reduced over time. Because of this configuration, it becomes possible to reduce inconvenience that the driver feels for the display on the W/S 6.

(3) When the change amount ($\phi d$ or $\psi d$) that has exceeded the corresponding threshold value ($\phi th$ or $\psi th$) returns to a value less than or equal to the threshold value, the computer returns the degree of highlighting of the driver viewpoint image that has been reduced to the original degree of highlighting in a shorter period of time than a period that elapsed when the degree of highlighting was reduced.

As a result, since when the line of sight of the driver returns from another target object to a target object that the driver viewpoint image indicates, the degree of highlighting of the driver viewpoint image that has been reduced promptly returns to the original degree of highlighting, the display on the W/S 6 smoothly changes according to the change in the line of sight. Because of this configuration, it becomes possible to reduce inconvenience that the driver feels for the display on the W/S 6.

(4) The degree of highlighting of the driver viewpoint image is at least one of luminance and saturation of the driver viewpoint image.

As a result, changing at least one of the luminance and the saturation of the driver viewpoint image according to a magnitude relation between the threshold value ($\phi th$ or $\psi th$) and the corresponding change amount ($\phi d$ or $\psi d$) enables inconvenience that the driver feels for the display on the W/S 6 to be reduced.

Variation of Second Embodiment (1) In the second embodiment, a configuration to, when the change amount ($\phi d$ or $\psi d$) that has exceeded the corresponding threshold value ($\phi th$ or $\psi th$) returns to a value less than or equal to the threshold value, return the degree of highlighting of the driver viewpoint image that has been reduced to the original degree of highlighting in a shorter period of time than a period that elapsed when the degree of highlighting was reduced was employed. However, the present invention is not limited to the configuration.

That is, a configuration to, when the change amount ($\phi$d or $\psi$d) that has exceeded the corresponding threshold value ($\phi$th or $\psi$th) returns to a value less than or equal to the threshold value, immediately return the degree of highlighting that has been reduced to the original degree of highlighting may be employed.

In this case, since when the line of sight of the driver returns from another target object to a target object that the driver viewpoint image indicates, the degree of highlighting of the driver viewpoint image that has been reduced instantly returns to the original degree of highlighting, the display on the W/S 6 instantly changes according to change in the line of sight even when change speed of the line of sight is fast. Because of this configuration, it becomes possible to reduce inconvenience that the driver feels for the display on the W/S 6.

Other Embodiments

Although the embodiments of the present invention are disclosed as described above, the statements and drawings constituting a portion of this disclosure should not be construed as a limitation of the present invention. From this disclosure, various alternative embodiments, examples, and operation technologies will be easily apparent to a person skilled in the art.

In addition, it is needless to say that the present invention includes various embodiments and the like that are not described herein, such as a configuration to which the respective configurations described in the above-described embodiments are optionally applied. Therefore, the technical scope of the present invention is determined only by the subject matter according to the claims reasonably derived from the foregoing descriptions.

REFERENCE SIGNS LIST

1 Display control device
2 Radar
3 Camera
4 IVI
5 DMS
6 W/S
10 HUD
20 Controller
21 Display target position calculation unit
22 Reference display position calculation unit
23 Reference display image generation unit
24 Viewpoint position calculation unit
25 Viewpoint correction value calculation unit
26 Corrected display position calculation unit
27 Image correction control unit
28 Corrected display image generation unit
30 Projector
LV Leading vehicle
IC Icon
ER Right eye
EL Left eye
DH Head of a driver
SE Displayable area
HA Horizontal threshold value band
VA Vertical threshold value band

The invention claimed is:

1. A display control method for causing a computer to perform processing comprising:
   generating an image to be presented to a driver in a preset coordinate system;
   detecting a position of an eye of the driver;
   identifying a viewpoint position indicating a position of an eye of a driver in a vehicle interior, based on the detected position of an eye;
   identifying a display position at which the generated image is displayed in a field of vision of the driver, based on the identified viewpoint position;
   generating a driver viewpoint image, the driver viewpoint image being an image obtained by converting the generated image to an image represented in a coordinate system defined with the identified viewpoint position as a reference;
   causing the driver viewpoint image to be displayed in such a manner that the driver viewpoint image overlaps a field of vision of the driver;
   detecting a line of sight of the driver;
   determining whether or not a change amount of the detected line of sight exceeds a preset threshold value; and
   when determining that a change amount of the detected line of sight exceeds the threshold value, suppressing change in a position at which the driver viewpoint image is displayed occurring in association with change in the viewpoint position,
   wherein a change amount of the line of sight includes a horizontal change amount, the horizontal change amount being a change amount of the line of sight from center point coordinates and being a change amount of the line of sight in a horizontal direction with the center point coordinates as a reference, and a vertical change amount, the vertical change amount being a change amount of the line of sight from the center point coordinates and being a change amount of the line of sight in a vertical direction with the center point coordinates as a reference,
   wherein the threshold value includes a horizontal angle threshold value, the horizontal angle threshold value being a value indicating an angle formed in the horizontal direction from the center point coordinates, and a vertical angle threshold value, the vertical angle threshold value being a value indicating an angle formed in the vertical direction from the center point coordinates, and
   wherein the computer
   at a time point when determining that the change amount exceeds the threshold value, erases the driver viewpoint image, and
   when the change amount having exceeded the threshold value returns to a value less than or equal to the threshold value, redisplays the erased driver viewpoint image.

2. The display control method according to claim 1, wherein the computer, at a time point when determining that the change amount exceeds the threshold value, causes the driver viewpoint image to fade out and to be erased.

3. The display control method according to claim 2, wherein the computer, when the change amount having exceeded the threshold value returns to a value less than or equal to the threshold value, causes the erased driver viewpoint image to fade in and to be redisplayed in a shorter period of time than a period in which the driver viewpoint image is caused to fade out and to be erased.

4. The display control method according to claim 2, wherein the computer, when the change amount having exceeded the threshold value returns to a value less than or equal to the threshold value, immediately redisplays the erased driver viewpoint image.

5. A display control method for causing a computer to perform processing comprising:
generating an image to be presented to a driver in a preset coordinate system;
detecting a position of an eye of the driver;
identifying a viewpoint position indicating a position of an eye of a driver in a vehicle interior, based on the detected position of an eye;
identifying a display position at which the generated image is displayed in a field of vision of the driver, based on the identified viewpoint position;
generating a driver viewpoint image, the driver viewpoint image being an image obtained by converting the generated image to an image represented in a coordinate system defined with the identified viewpoint position as a reference;
causing the driver viewpoint image to be displayed in such a manner that the driver viewpoint image overlaps a field of vision of the driver;
detecting a line of sight of the driver;
determining whether or not a change amount of the detected line of sight exceeds a preset threshold value; and
when determining that a change amount of the detected line of sight exceeds the threshold value, suppressing change in a position at which the driver viewpoint image is displayed occurring in association with change in the viewpoint position,
wherein a change amount of the line of sight includes a horizontal change amount, the horizontal change amount being a change amount of the line of sight from center point coordinates and being a change amount of the line of sight in a horizontal direction with the center point coordinates as a reference, and a vertical change amount, the vertical change amount being a change amount of the line of sight from the center point coordinates and being a change amount of the line of sight in a vertical direction with the center point coordinates as a reference,
wherein the threshold value includes a horizontal angle threshold value, the horizontal angle threshold value being a value indicating an angle formed in the horizontal direction from the center point coordinates, and a vertical angle threshold value, the vertical angle threshold value being a value indicating an angle formed in the vertical direction from the center point coordinates, and
wherein the computer
at a time point when determining that the change amount exceeds the threshold value, reduces a degree of highlighting of the driver viewpoint image, and
when the change amount having exceeded the threshold value returns to a value less than or equal to the threshold value, returns a degree of highlighting having been reduced to an original degree of highlighting.

6. The display control method according to claim 5, wherein the computer, at a time point when determining that the change amount exceeds the threshold value, reduces the degree of highlighting over time.

7. The display control method according to claim 6, wherein the computer, when the change amount having exceeded the threshold value returns to a value less than or equal to the threshold value, returns the degree of highlighting having been reduced to an original degree of highlighting in a shorter period of time than a period having elapsed when the degree of highlighting was reduced.

8. The display control method according to claim 6, wherein the computer, when the change amount having exceeded the threshold value returns to a value less than or equal to the threshold value, immediately returns the degree of highlighting having been reduced to an original degree of highlighting.

9. The display control method according to claim 5, wherein the degree of highlighting is at least one of luminance and saturation of the driver viewpoint image.

10. A display control device comprising a computer configured to perform processing comprising:
generating an image to be presented to a driver in a preset coordinate system;
detecting a position of an eye of the driver;
identifying a viewpoint position indicating a position of an eye of a driver in a vehicle interior, based on the detected position of an eye;
identifying a display position at which the generated image is displayed in a field of vision of the driver, based on the identified viewpoint position;
generating a driver viewpoint image, the driver viewpoint image being an image obtained by converting the generated image to an image represented in a coordinate system defined with the identified viewpoint position as a reference;
causing the driver viewpoint image to be displayed in such a manner that the driver viewpoint image overlaps a field of vision of the driver;
detecting a line of sight of the driver;
determining whether or not a change amount of the detected line of sight exceeds a preset threshold value; and
when determining that a change amount of the detected line of sight exceeds the threshold value, suppressing change in a position at which the driver viewpoint image is displayed occurring in association with change in the viewpoint position,
wherein a change amount of the line of sight includes a horizontal change amount, the horizontal change amount being a change amount of the line of sight from center point coordinates and being a change amount of the line of sight in a horizontal direction with the center point coordinates as a reference, and a vertical change amount, the vertical change amount being a change amount of the line of sight from the center point coordinates and being a change amount of the line of sight in a vertical direction with the center point coordinates as a reference,
wherein the threshold value includes a horizontal angle threshold value, the horizontal angle threshold value being a value indicating an angle formed in the horizontal direction from the center point coordinates, and a vertical angle threshold value, the vertical angle threshold value being a value indicating an angle formed in the vertical direction from the center point coordinates, and
wherein the computer
at a time point when determining that the change amount exceeds the threshold value, erases the driver viewpoint image, and when the change amount having exceeded the threshold value returns to a value less than or equal to the threshold value, redisplays the erased driver viewpoint image.

11. A display control method for causing a computer to perform processing comprising:
generating an image to be presented to a driver in a preset coordinate system;
detecting a position of an eye of the driver;
identifying a viewpoint position indicating a position of an eye of a driver in a vehicle interior, based on the detected position of an eye;
identifying a display position at which the generated image is displayed in a field of vision of the driver, based on the identified viewpoint position;
generating a driver viewpoint image, the driver viewpoint image being an image obtained by converting the generated image to an image represented in a coordinate system defined with the identified viewpoint position as a reference;
causing the driver viewpoint image to be displayed in such a manner that the driver viewpoint image overlaps a field of vision of the driver;
detecting a line of sight of the driver;
determining whether or not a change amount of the detected line of sight exceeds a preset threshold value; and
when determining that a change amount of the detected line of sight exceeds the threshold value, suppressing change in a position at which the driver viewpoint image is displayed occurring in association with change in the viewpoint position,
wherein the computer
at a time point when determining that the change amount exceeds the threshold value, causes the driver viewpoint image to fade out and to be erased, and
when the change amount having exceeded the threshold value returns to a value less than or equal to the threshold value, causes the erased driver viewpoint image to fade in and to be redisplayed in a shorter period of time than a period in which the driver viewpoint image is caused to fade out and to be erased.

12. A display control device comprising a computer configured to perform processing comprising:
generating an image to be presented to a driver in a preset coordinate system;
detecting a position of an eye of the driver;
identifying a viewpoint position indicating a position of an eye of a driver in a vehicle interior, based on the detected position of an eye;
identifying a display position at which the generated image is displayed in a field of vision of the driver, based on the identified viewpoint position;
generating a driver viewpoint image, the driver viewpoint image being an image obtained by converting the generated image to an image represented in a coordinate system defined with the identified viewpoint position as a reference;
causing the driver viewpoint image to be displayed in such a manner that the driver viewpoint image overlaps a field of vision of the driver;
detecting a line of sight of the driver;
determining whether or not a change amount of the detected line of sight exceeds a preset threshold value; and
when determining that a change amount of the detected line of sight exceeds the threshold value, suppressing change in a position at which the driver viewpoint image is displayed occurring in association with change in the viewpoint position,
wherein the computer
at a time point when determining that the change amount exceeds the threshold value, causes the driver viewpoint image to fade out and to be erased, and
when the change amount having exceeded the threshold value returns to a value less than or equal to the threshold value, causes the erased driver viewpoint image to fade in and to be redisplayed in a shorter period of time than a period in which the driver viewpoint image is caused to fade out and to be erased.

13. A display control method for causing a computer to perform processing comprising:
generating an image to be presented to a driver in a preset coordinate system;
detecting a position of an eye of the driver;
identifying a viewpoint position indicating a position of an eye of a driver in a vehicle interior, based on the detected position of an eye;
identifying a display position at which the generated image is displayed in a field of vision of the driver, based on the identified viewpoint position;
generating a driver viewpoint image, the driver viewpoint image being an image obtained by converting the generated image to an image represented in a coordinate system defined with the identified viewpoint position as a reference;
causing the driver viewpoint image to be displayed in such a manner that the driver viewpoint image overlaps a field of vision of the driver;
detecting a line of sight of the driver;
determining whether or not a change amount of the detected line of sight exceeds a preset threshold value; and
when determining that a change amount of the detected line of sight exceeds the threshold value, suppressing change in a position at which the driver viewpoint image is displayed occurring in association with change in the viewpoint position,
wherein a change amount of the line of sight includes a horizontal change amount, the horizontal change amount being a change amount of the line of sight from center point coordinates and being a change amount of the line of sight in a horizontal direction with the center point coordinates as a reference, and a vertical change amount, the vertical change amount being a change amount of the line of sight from the center point coordinates and being a change amount of the line of sight in a vertical direction with the center point coordinates as a reference,
the threshold value includes a horizontal angle threshold value, the horizontal angle threshold value being a value indicating an angle formed in the horizontal direction from the center point coordinates, and a vertical angle threshold value, the vertical angle threshold value being a value indicating an angle formed in the vertical direction from the center point coordinates,
the computer
at a time point when determining that the change amount exceeds the threshold value, reduces a degree of highlighting of the driver viewpoint image, and
when the change amount having exceeded the threshold value returns to a value less than or equal to the threshold value, returns a degree of highlighting having been reduced to an original degree of highlighting, and the degree of highlighting is luminance and saturation of the driver viewpoint image.

14. A display control device comprising a computer configured to perform processing comprising:
generating an image to be presented to a driver in a preset coordinate system;
detecting a position of an eye of the driver;
identifying a viewpoint position indicating a position of an eye of a driver in a vehicle interior, based on the detected position of an eye;
identifying a display position at which the generated image is displayed in a field of vision of the driver, based on the identified viewpoint position;
generating a driver viewpoint image, the driver viewpoint image being an image obtained by converting the generated image to an image represented in a coordinate system defined with the identified viewpoint position as a reference;
causing the driver viewpoint image to be displayed in such a manner that the driver viewpoint image overlaps a field of vision of the driver;
detecting a line of sight of the driver;
determining whether or not a change amount of the detected line of sight exceeds a preset threshold value; and
when determining that a change amount of the detected line of sight exceeds the threshold value, suppressing change in a position at which the driver viewpoint image is displayed occurring in association with change in the viewpoint position,
wherein a change amount of the line of sight includes a horizontal change amount, the horizontal change amount being a change amount of the line of sight from center point coordinates and being a change amount of the line of sight in a horizontal direction with the center point coordinates as a reference, and a vertical change amount, the vertical change amount being a change amount of the line of sight from the center point coordinates and being a change amount of the line of sight in a vertical direction with the center point coordinates as a reference,
the threshold value includes a horizontal angle threshold value, the horizontal angle threshold value being a value indicating an angle formed in the horizontal direction from the center point coordinates, and a vertical angle threshold value, the vertical angle threshold value being a value indicating an angle formed in the vertical direction from the center point coordinates,
the computer
at a time point when determining that the change amount exceeds the threshold value, reduces a degree of highlighting of the driver viewpoint image, and
when the change amount having exceeded the threshold value returns to a value less than or equal to the threshold value, returns a degree of highlighting having been reduced to an original degree of highlighting, and
the degree of highlighting is luminance and saturation of the driver viewpoint image.

15. A display control method for causing a computer to perform processing comprising:
generating an image to be presented to a driver in a preset coordinate system;
detecting a position of an eye of the driver;
identifying a viewpoint position indicating a position of an eye of a driver in a vehicle interior, based on the detected position of an eye;
identifying a display position at which the generated image is displayed in a field of vision of the driver, based on the identified viewpoint position;
generating a driver viewpoint image, the driver viewpoint image being an image obtained by converting the generated image to an image represented in a coordinate system defined with the identified viewpoint position as a reference;
causing the driver viewpoint image to be displayed in such a manner that the driver viewpoint image overlaps a field of vision of the driver;
detecting a line of sight of the driver;
determining whether or not a change amount of the detected line of sight exceeds a preset threshold value; and
when determining that a change amount of the detected line of sight exceeds the threshold value, suppressing change in a position at which the driver viewpoint image is displayed occurring in association with change in the viewpoint position,
wherein the computer
at a time point when determining that the change amount exceeds the threshold value, causes the driver viewpoint image to fade out and to be erased, and
when the change amount having exceeded the threshold value returns to a value less than or equal to the threshold value, immediately redisplays the erased driver viewpoint image.

16. A display control device comprising a computer configured to perform processing comprising:
generating an image to be presented to a driver in a preset coordinate system;
detecting a position of an eye of the driver;
identifying a viewpoint position indicating a position of an eye of a driver in a vehicle interior, based on the detected position of an eye;
identifying a display position at which the generated image is displayed in a field of vision of the driver, based on the identified viewpoint position;
generating a driver viewpoint image, the driver viewpoint image being an image obtained by converting the generated image to an image represented in a coordinate system defined with the identified viewpoint position as a reference;
causing the driver viewpoint image to be displayed in such a manner that the driver viewpoint image overlaps a field of vision of the driver;
detecting a line of sight of the driver;
determining whether or not a change amount of the detected line of sight exceeds a preset threshold value; and
when determining that a change amount of the detected line of sight exceeds the threshold value, suppressing change in a position at which the driver viewpoint image is displayed occurring in association with change in the viewpoint position,
wherein the computer
at a time point when determining that the change amount exceeds the threshold value, causes the driver viewpoint image to fade out and to be erased, and
when the change amount having exceeded the threshold value returns to a value less than or equal to the threshold value, immediately redisplays the erased driver viewpoint image.

17. A display control device comprising a computer configured to perform processing comprising:

generating an image to be presented to a driver in a preset coordinate system;
detecting a position of an eye of the driver;
identifying a viewpoint position indicating a position of an eye of a driver in a vehicle interior, based on the detected position of an eye;
identifying a display position at which the generated image is displayed in a field of vision of the driver, based on the identified viewpoint position;
generating a driver viewpoint image, the driver viewpoint image being an image obtained by converting the generated image to an image represented in a coordinate system defined with the identified viewpoint position as a reference;
causing the driver viewpoint image to be displayed in such a manner that the driver viewpoint image overlaps a field of vision of the driver;
detecting a line of sight of the driver;
determining whether or not a change amount of the detected line of sight exceeds a preset threshold value; and
when determining that a change amount of the detected line of sight exceeds the threshold value, suppressing change in a position at which the driver viewpoint image is displayed occurring in association with change in the viewpoint position,
wherein a change amount of the line of sight includes a horizontal change amount, the horizontal change amount being a change amount of the line of sight from center point coordinates and being a change amount of the line of sight in a horizontal direction with the center point coordinates as a reference, and a vertical change amount, the vertical change amount being a change amount of the line of sight from the center point coordinates and being a change amount of the line of sight in a vertical direction with the center point coordinates as a reference,
wherein the threshold value includes a horizontal angle threshold value, the horizontal angle threshold value being a value indicating an angle formed in the horizontal direction from the center point coordinates, and a vertical angle threshold value, the vertical angle threshold value being a value indicating an angle formed in the vertical direction from the center point coordinates, and
wherein the computer
at a time point when determining that the change amount exceeds the threshold value, reduces a degree of highlighting of the driver viewpoint image, and
when the change amount having exceeded the threshold value returns to a value less than or equal to the threshold value, returns a degree of highlighting having been reduced to an original degree of highlighting.

* * * * *